United States Patent
Veldman

(10) Patent No.: US 6,182,373 B1
(45) Date of Patent: Feb. 6, 2001

(54) METHOD AND APPARATUS FOR CUTTING BASEBOARD MOLDING

(76) Inventor: Robert Veldman, RR8-30-1, Lethbridge, Alberta (CA), T1J 4P4

( * ) Notice: Under 35 U.S.C. 154(b), the term of this patent shall be extended for 0 days.

(21) Appl. No.: 09/149,264

(22) Filed: Sep. 8, 1998

(51) Int. Cl.$^7$ .............................. B27M 3/00; B27M 1/08
(52) U.S. Cl. .................................... 33/630; 33/526; 83/13; 144/3.1; 144/144.1; 144/367; 144/372
(58) Field of Search ................. 33/194, 197, 562, 33/563, 565, 566, 613; 83/13, 565; 144/3.1, 144.1, 367, 371, 372; 29/464, 527.1; 264/220

(56) References Cited

U.S. PATENT DOCUMENTS

| | | | |
|---|---|---|---|
| 698,064 | * 4/1902 | Scott et al. | 83/565 |
| 4,109,434 | 8/1978 | Katzin | 52/287 |
| 4,502,232 | * 3/1985 | Broders | 33/562 |
| 4,607,434 | * 8/1986 | Francis | 33/630 |
| 4,845,910 | 7/1989 | Hanson et al. | 52/288 |
| 4,880,042 | * 11/1989 | Schafferkotter | 144/372 |
| 5,038,646 | * 8/1991 | Suwitoadji | 83/565 |
| 5,094,279 | * 3/1992 | Dickey et al. | 144/372 |
| 5,157,886 | 10/1992 | Azzar et al. | 52/716 |
| 5,357,053 | 10/1994 | Manaras | 174/48 |
| 5,893,402 | * 4/1999 | Darling | 144/144.1 |
| 5,918,524 | * 7/1999 | Kirby | 83/565 |
| 5,960,843 | * 10/1999 | Witt | 144/372 |

* cited by examiner

Primary Examiner—G. Bradley Bennett
(74) Attorney, Agent, or Firm—David S. Thompson

(57) ABSTRACT

A method and apparatus for cutting baseboard molding to join two adjacent pieces in an inside corner provides a plate constructed with at least one patterned cutting edge having a contour which conforms to the front face of a baseboard molding. A plate support is adapted to carry the plate, and is in turn itself carried by a clamping apparatus of known type which typically combines features of a vise and a table. The baseboard molding to be cut is carried adjacent to the plate support within the clamping apparatus. Upper and lower angle boards may be used to support the baseboard molding to be cut at a slight angle from perpendicular to the blade making the cut, in a manner that allows a slight bevel to be made in the cut. A cutting device such as a router is then traced along the patterned cutting edge, thereby cutting off an end of a first piece of baseboard molding in a contour which corresponds to the face of a second piece of baseboard molding. The cut end is therefore adapted for contact with the face of an adjacent piece of baseboard molding oriented at right angles.

6 Claims, 3 Drawing Sheets

FIG. 10

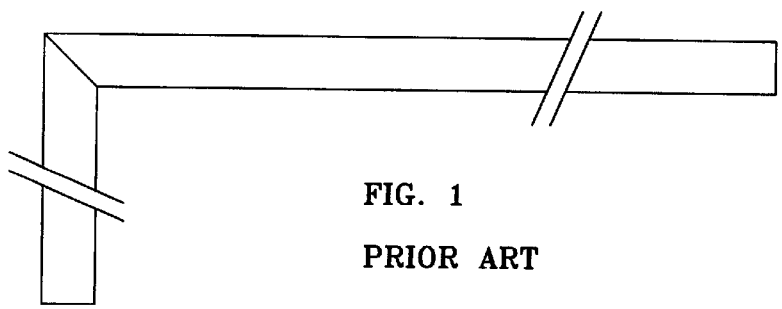
FIG. 1
PRIOR ART
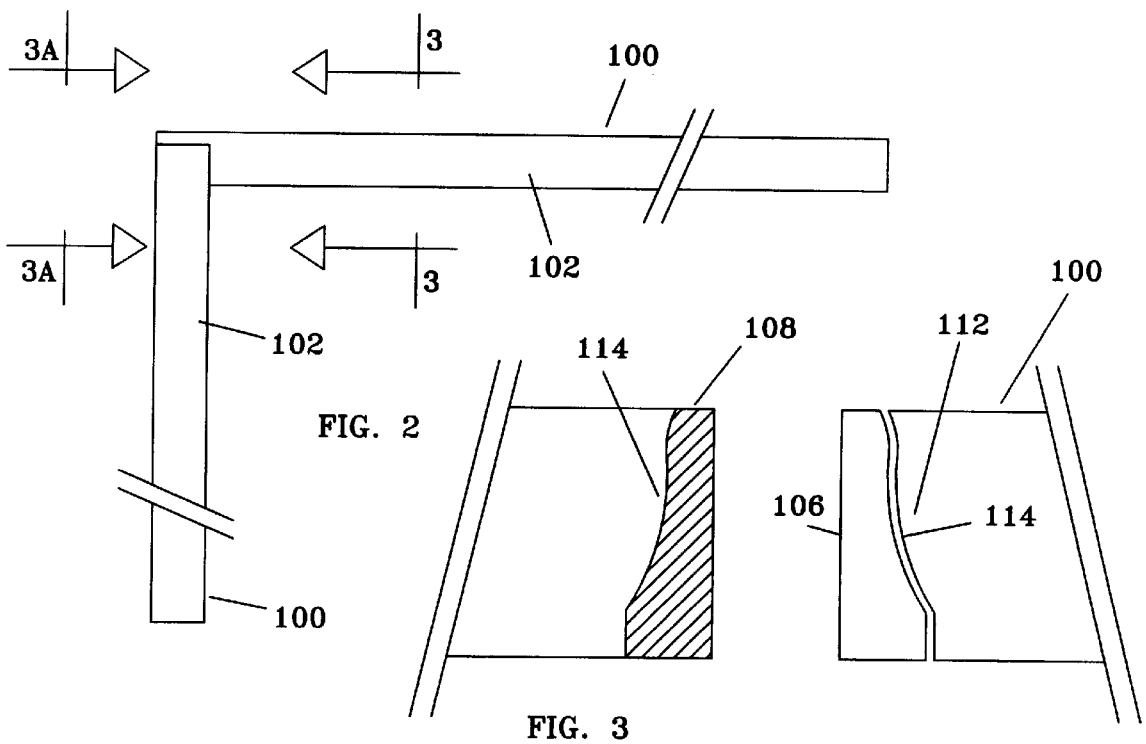
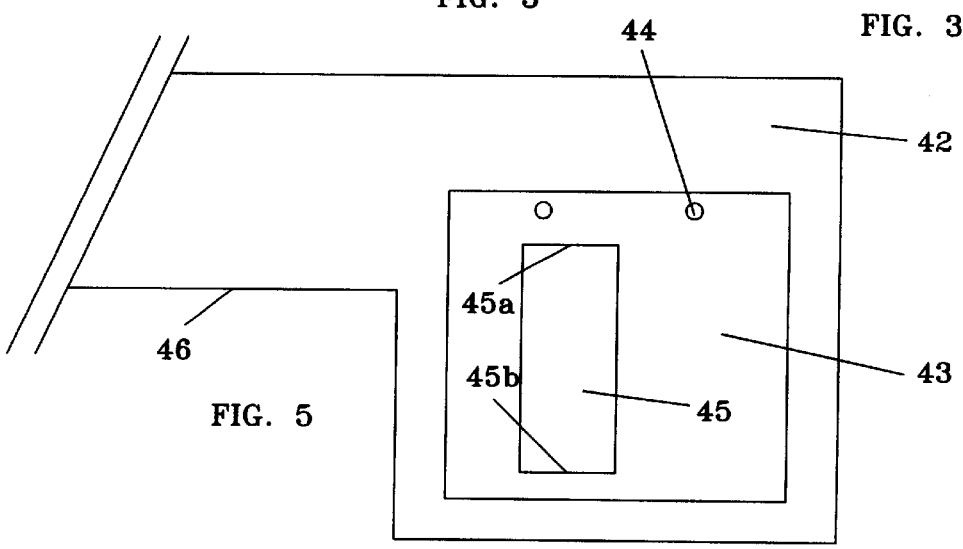

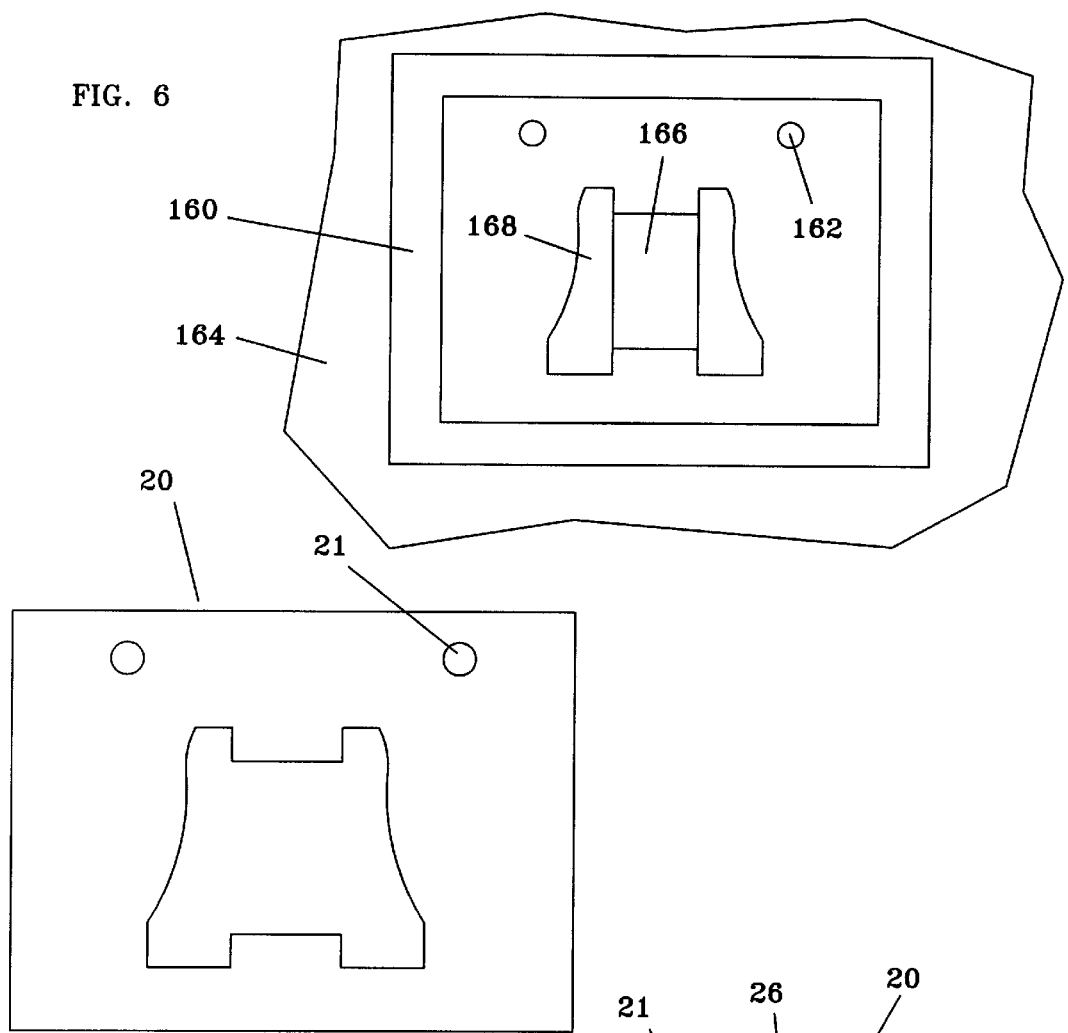
FIG. 6
FIG. 7
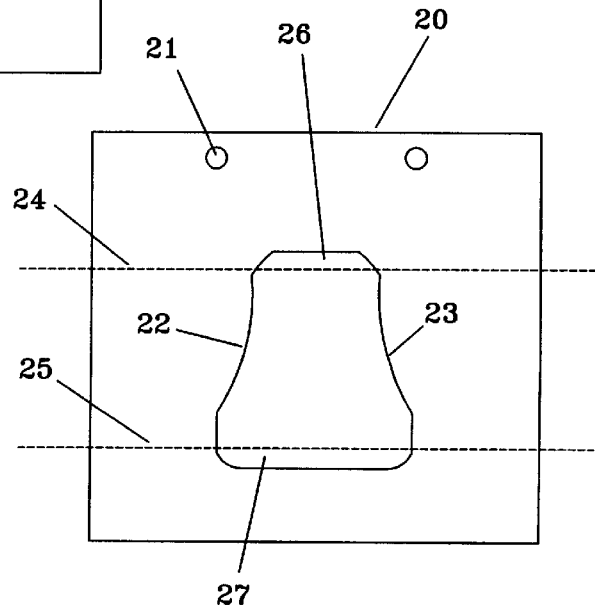
FIG. 8

METHOD AND APPARATUS FOR CUTTING BASEBOARD MOLDING

CROSS-REFERENCES

There are no applications related to this application filed in this or any foreign country.

BACKGROUND

Baseboard molding is attached to the lower portion of the wallboard adjacent to the floor in most residential and commercial construction. Where two adjacent walls come together to form an inside corner, it is generally the case that the strip of baseboard molding carried by each wall is cut at a 45 degree angle. The cut edges are then mated together in a symmetrical manner, as seen in FIG. 1, labeled "Prior Art."

The problem with this method of construction is revealed where the angle cut is not exactly 45 degrees on one or both of the pieces of baseboard molding. In this event, the joint where the adjacent pieces of baseboard molding join will typically have gaps which degrade the appearance of the joint This problem is accentuated in the event where the front face of the molding is stylized, such as by rounded or similar decorative surfaces.

A further problem with this method of construction is that both pieces of baseboard molding must be cut at 45 degrees. This requires that two baseboard cuts be made for each inside corner. Since each cut provides an added cost and opportunity for error, the resulting wastage of baseboard molding due to inaccurate cuts is increased.

Both of these problems are further exacerbated in the event the the adjacent walls forming the inside corner are not oriented at exactly 90 degrees. Where this is the case, correctly cut baseboard moldings will result in an unsatisfactory installation and appearance.

What is needed is a method and apparatus for cutting baseboard molding that requires that only one of the two adjacent baseboard molding pieces be cut. The apparatus and method of use must reduce the appearance of gaps or other similar construction flaws between the mated pieces of baseboard molding. The method and apparatus must conform to any molding type, having any height, thickness and ornamental surface configuration. The method and apparatus must also allow for extremely rapid and convenient cutting, with high-quality output.

SUMMARY

The present invention is directed to an apparatus that satisfies the above needs. A novel method and apparatus for cutting baseboard molding is provided that requires that only one of two adjacent baseboard molding piece be cut, wherein the end of a first piece of molding to abut in a flush manner to the face of a second piece of molding.

The method and apparatus for making a cut in a piece of baseboard molding of the present invention provides some or all of the following structures and steps.

(A) Forming a plate having at least one patterned cutting edge, wherein the at least one patterned cutting edge is defined to correspond to the front face of a baseboard molding to be cut, and wherein the plate provides an alignment structure to align the patterned cutting edge with the baseboard molding to be cut.

(B) Attaching the plate to a plate support, whereby the plate support engages the alignment structure of the plate, thereby holding the plate in alignment with the plate support, whereby a cutting hole defined in the plate support is adjacent to the patterned cutting edge of the plate.

(C) Securing upper and lower angle boards to the plate support.

(D) Securing the plate support between the jaws of a clamping apparatus.

(E) Securing the piece of baseboard molding to be cut between the jaws of the clamping apparatus, in a location adjacent to the plate support.

(F) Cutting with a router or similar tool along the patterned cutting edge of the plate, thereby making the cut in the piece of baseboard molding.

A more detailed description of the method and apparatus for cutting baseboard molding includes the following:

(A) Regulating the angle of inclination of the baseboard molding to be cut by adjusting screws carried by the upper and lower angle boards to result in a slight bevel in the cut in the piece of baseboard molding.

It is therefore a primary advantage of the present invention to provide a novel method and apparatus for cutting baseboard molding that reduces the appearance of gaps or defects between mated pieces of baseboard molding.

Another advantage of the present invention is to provide a method and apparatus for cutting baseboard molding that conforms to any molding type, having any height, thickness and ornamental surface configuration.

Another advantage of the present invention is to provide a method and apparatus for cutting baseboard molding that requires only one piece of molding to be cut to form an inside corner.

A still further advantage of the present invention is to provide a method and apparatus for cutting baseboard molding that supports extremely rapid and convenient cutting with high-quality output.

DRAWINGS

These and other features, aspects, and advantages of the present invention will become better understood with regard to the following description, appended claims, and accompanying drawings where:

FIG. 1 is a top view of a prior art baseboard molding joint, showing how two mirror image baseboard molding pieces, each having a 45 degree angle cut, are mated together.

FIG. 2 is a top view of two pieces of molding having been joined according to a version of the method and apparatus of the present invention.

FIG. 3 is a partial cross-sectional view of the two pieces of baseboard molding of FIG. 2, taken along the 3—3 lines, showing how the end of a first piece of molding is cut to conform to the face of a second piece of molding.

FIG. 3A is an isometric view of the two pieces of baseboard molding of FIG. 2, taken along the 3A—3A lines, showing how the cut surface of the cut piece of baseboard molding can be cut with a slight bevel, thereby allowing the front faces of the adjacent pieces to conform to each other, even if the walls to which the baseboard moldings are attached are not oriented at precisely 90 degrees.

FIG. 5 is an enlarged view of the head portion of the plate support assembly of FIG. 4.

FIG. 6 is a view of a plate being formed in a mold, the mold also containing two pieces of baseboard molding separated by a spacer.

FIG. 7 is a view of the plate formed in FIG. 6, having been removed from the mold.

FIG. 8 is a view of the plate of FIG. 7, having been modified to include upper and lower extended notches.

DESCRIPTION

Figure 4:
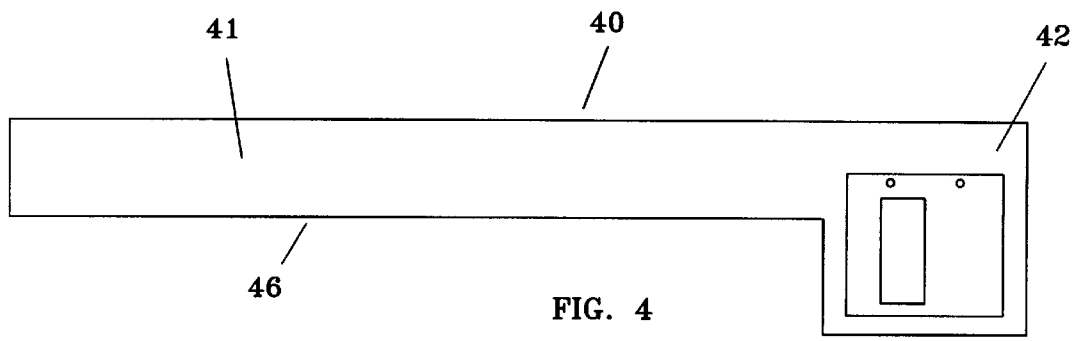
FIG. 4 is a view of a version of the plate support assembly of the invention.

Referring in generally to FIGS. 1 through 10, an apparatus constructed in accordance with the principles of the invention is seen. A plate 20 is constructed with at least one patterned cutting edge having a contour which conforms to the front face 102 of a baseboard molding 100. A plate support 40 is adapted to carry the plate 20, and is in turn itself carried by a clamping apparatus 130 of known type which typically combines features of a vise and a table. The baseboard molding 100 to be cut is carried adjacent to the plate support within the clamping apparatus. Upper and lower angle boards 60, 70 may be used to support the baseboard molding to be cut at a slight angle from perpendicular to the blade making the cut, in a manner that allows a slight bevel to be made in the cut. A cutting device such as a router is then traced along the patterned cutting edge, thereby cutting off an end of a first piece of baseboard molding in a contour which corresponds to the face of a second piece of baseboard molding. The cut end is therefore adapted for contact with the face of an adjacent piece of baseboard molding oriented at right angles.

Referring to FIGS. 6 through 8, the construction of the plate 20 may be understood. The plate 20 includes some type of alignment means for properly orienting the plate with respect to the plate support 40. In the preferred embodiment, the alignment means includes left and right alignment holes 21, which also permit the plate to be fastened to the plate support 40 by screws or other fasteners. A patterned cutting edge 22 is typically opposite a mirror image spare cutting edge 23. In the circumstance that the patterned cutting edge is damaged, typically by the router or other cutting tool, then the plate may be flipped over, so that the spare cutting edge is transferred in the location of the patterned cutting edge.

In a preferred version of the invention, the plate 20 is constructed in a mold 160, as seen in FIG. 6. The mold 160 is typically square or rectangular, with sides having a height of about 0.25 inches. The mold is carried by a flat supporting surface 164. Left and right nails 162 are used to form the left and right alignment holes 21.

Still referring to FIG. 6, two opposed, back-to-back, pieces of baseboard molding 168 are separated by a spacer 166, and are typically held together in a bundle by a rubber band or similar fastening means. The bundled molding pieces and spacer are oriented perpendicularly to the supporting surface 164, i.e. the ends of the molding pieces stand on the supporting surface. The molding pieces and spacer may be as short as an inch or so, provided they are longer than the thickness of the plate being formed. The spacer is typically attached to the supporting surface 164 by a wood screw or other fastener, which is directed through the supporting surface and then into the spacer. This prevents movement of the bundle as the fiberglass resin hardens.

The opposed pieces of molding and the spacer are positioned within the mold so that a line 24 tangent to the upper edges of the two pieces of baseboard molding is colinear with a lower edge 46 of the body 41 of the plate support 40. A line 25 that is tangent to the lower edge of the baseboard molding is parallel to the upper line 24.

In a preferred version of the invention, liquid fiberglass resin or similar material is then poured into the mold. A coating of vegetable oil, typically applied from a spray-on container, may be applied to the supporting surface prior to the addition of the fiberglass resin. This coating will allow easy removal of the plate after the resin has hardened. Approximately 90 cubic centimeters or resin may be required. A quarter teaspoon of hardener is added to the liquid fiberglass. The resin is added to the mold in an evenly-distributed manner, so that it surrounds the back-to-back baseboard moldings and the spacer, as well as the two nails 162. Once the resin has been distributed, it is allowed to set-up. The set-up time may be approximately 30 minutes.

After set-up, the plate 20 is removed. The plate typically has an appearance similar to that seen in FIG. 7, but the actual appearance depends on the shape of the molding pieces 168 used. The plate 20 at this stage of manufacture is rectangular, having alignment holes 21 defined where the nails 162 where and a hole corresponding to the bundled pieces of baseboard molding 168 and spacer 166 were.

Using a router or similar tool, the upper and lower extended notches 26, 27 are made in the plate. The upper and lower extended notches extend above and below, respectively, the lines 24, 25 tangent to the upper and lower edges of the baseboard molding. The resulting plate is seen in FIG. 8. The upper and lower extended notches 26, 27 allow the user to completely cut off a piece of molding, as will be seen.

While a material that is widely available and adapted for use by do-it-yourselfers, such as fiberglass or resin, is preferred, the plate may be made of any desired material, such as plastic or metal. Such plates may be prefabricated and sold with the molding, if desired.

Referring to FIGS. 4, it can be seen that the plate support 40 includes an elongate body 41 having a head 42 at one end. The spatial relationship between the head and body is such that a piece of baseboard molding 100 carried flush along the lower edge 46 of the body 41 of the plate support 40 passes under the cutting hole 45 defined in the head 42 of the plate support.

Figure 10:
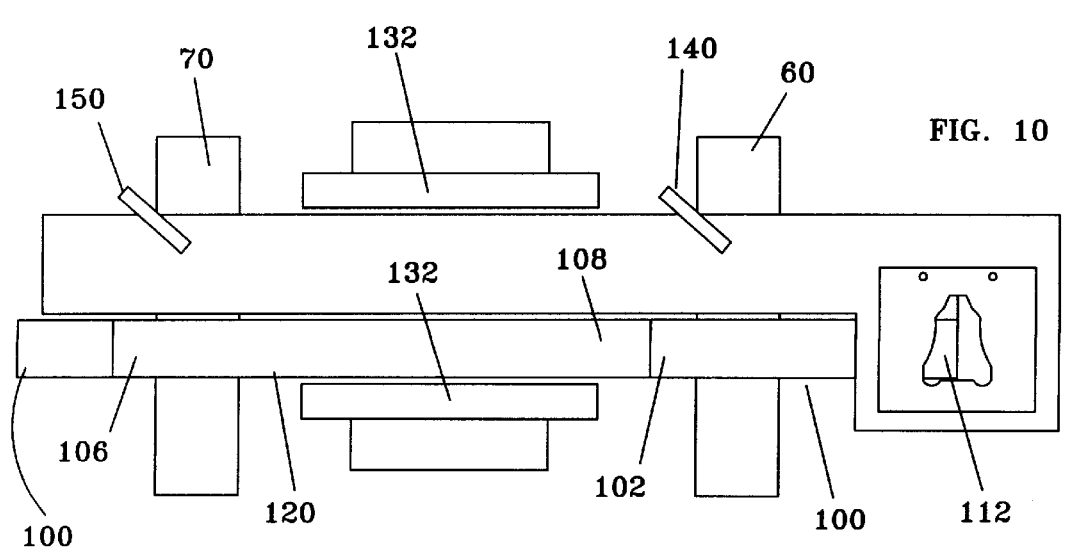
FIG. 10 is a view of the elements of FIG. 9, wherein the plate has been installed in the plate support, and the baseboard molding to be cut and the spare piece of baseboard molding are carried by the clamping apparatus.

Referring to FIG. 5, it can be seen the the head 42 includes a recessed area 43 which is incrementally greater in area than the plate 20, and is therefore readily adapted to carry a plate, as seen in FIG. 10. The recessed area serves both as an orientation or alignment guide to properly position the plate 20 with respect to the plate support 40, and also as a fastening means to loosely hold the plate on the plate support until the two can be more rigidly fastened together.

Two fastening holes 44 are defined within the recessed area 43. The fastening holes 44 are adapted to receive a screw or other fastener passed through the alignment holes 21 of the plate. This results in a rigid connection between the plate 20 and plate support 40.

As seen in FIG. 5, a cutting hole 45 is also defined within the recessed area. An upper edge 45a of the cutting hole typically extends above the lower edge 46 of the body 41 and a lower edge 45b of the cutting hole typically extends below the lower edge 46 by a distance greater than the height of most baseboard moldings.

Figure 9:
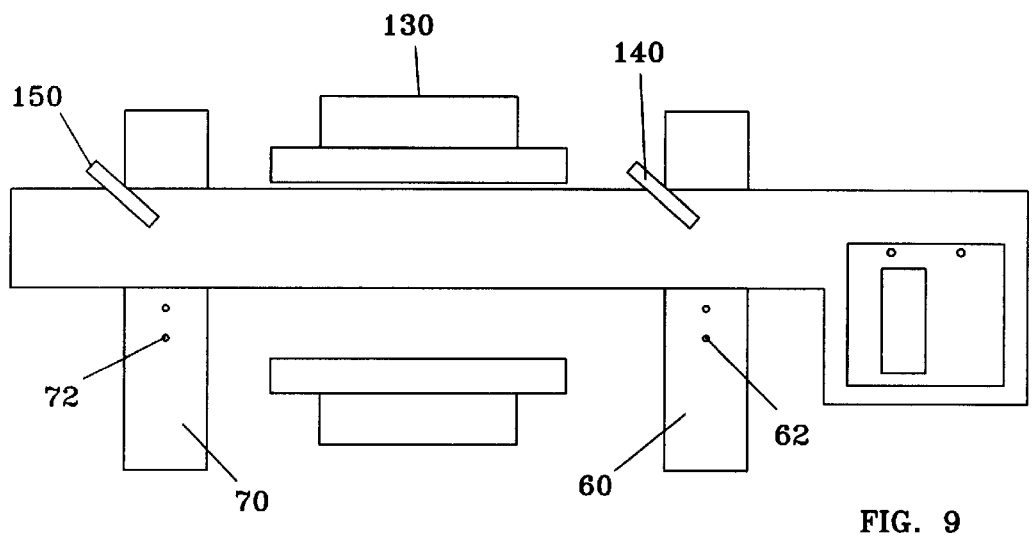
FIG. 9 is view of the plate support being carried by the jaws of the clamping apparatus, with the upper and lower angle boards being supported by C-clamps on the plate support.

Referring to FIG. 9, the upper angle board 60 and the lower angle board 70 are seen. The upper and lower angle boards support a piece of baseboard molding 100 to be cut, allowing the baseboard molding to be positioned touching the lower edge 46 of the body 41 of the plate support. The upper and lower angle boards are attached to the body 41 of the plate support 40 by upper and lower C-clamps 140, 150.

The upper and lower angle boards each carry a pair of screws 62, 72. The screw pairs support the back surface 106 of a piece of baseboard molding 100 to be cut a controlled distance above the angle boards.

Typically, it is desirable to support the end of the baseboard molding that is to be cut at a slightly higher elevation than the opposite end of the baseboard molding. This assumes that the front face 102 of the baseboard molding to be cut is oriented upwardly. This slight difference in elevation results in a slight bevel in the molding, as seen by a comparison of FIGS. 3 and 3A. Such a bevel is useful where the corner into which the baseboard molding is to be installed is not precisely 90 degrees. For example, if the walls are at 95 degrees due to warping or poor workmanship, and if there is no bevel cut into the molding, then the edge defined between the front face 102 and the cut surface 114 of a first piece of molding will not fit flush on the front face of an adjacent second piece of molding.

This can be more completely understood as follows. Referring to FIG. 3A, there is a slight separation between the edge defined by the intersection of the cut surface 114 and the back 106 of a first piece of baseboard molding and the front face 102 of a second piece of baseboard molding. If the angle between the first and second pieces of molding is greater than 90 degrees, the slight separation is reduced, eventually resulting in no separation. If the angle between the first and second pieces of molding is less than 90 degrees then the degree of the slight separation will increase.

If there were no slight separation, as seen in FIG. 3A, caused by the slight bevel cut described above, then an angle of slightly greater than 90 degrees between the first and second pieces of baseboard molding would result in a slight separation between the edge of the first piece of baseboard molding defined by the intersection of the cut surface 114 and the front face 102 and the front face of the second piece of baseboard molding. That is, the front faces of the two adjacent pieces of baseboard molding would not touch. This defect would be visible, and would result in a less attractive joining of the two pieces of baseboard molding.

The screws in each pair may be threaded in or out, thereby controlling how far above the respective angle board 60, 70 the head of each screw pair extends. In a preferred method, the screws are adjusted so that the screw pair 62 of the upper angle board 60 are elevated slightly more than the screw pair 72 of the lower angle board 70.

As seen in FIG. 9, the plate support 40, having the upper and lower angle boards 60, 70 attached by upper and lower C-clamps 140, 150, is put between the opposed jaws 132 of a clamping apparatus 130. The clamping apparatus 130 may be of a variety of wellknown types which typically provide a modified table surface having opposed vise-like jaws which firmly hold items carried between the jaws.

As seen in FIG. 10, the piece of baseboard molding 100 to be cut is also put between the jaws. An upper or top edge 108 of the baseboard molding is in contact with the lower edge 46 of the body 41 of the plate support 40. The baseboard molding is typically oriented so that the back 106 rests on the screw pairs 62, 72, and the front face 102 is directed upwardly.

As seen in FIG. 10, a spare piece 120 of molding may be put on top of the piece to be cut, and is typically oriented with the front face 102 pointed down.

The plate 20 is then placed into the recessed area 43 of the head 42 of the plate support 40. Fasteners are used to connect the alignment holes 21 of the plate to the fastening holes 44 of the plate support.

The baseboard molding to be cut is then slid left or right, until the desired location on the end 112 to be cut is located directly under the patterned cutting edge 22 of the plate. The jaws of the clamping apparatus are then closed, holding the elements seen in FIG. 10 in place.

The cut is then made, typically by a router or similar cutting tool. The cutting tool is moved along the patterned cutting edge 22 so that it extends downwardly, into the baseboard molding to be cut. The cutting tool is moved from the upper extended notch 26 above the baseboard molding to be cut, along the patterned cutting edge and therefore through the baseboard molding, to a position in the lower extended notch 27 below the baseboard molding to be cut Alternatively, the cutting direction could be reversed.

The baseboard molding, having been cut, is removed from the clamping apparatus for installation. The cut surface 114, as cut, should conform to the front face of a second piece of molding. As a result, the second piece of molding will only have to be cut to length, and the cut surface 114 of the first piece will fit against the front face 102 of the second piece.

Because of the need for custom manufacture of the plate required for any type of baseboard molding for which a standardized plate is not available, the previously described versions of the invention may be assembled as a kit of parts. In one version of the invention, the kit of parts would supply the means for making a plate defining at least one patterned cutting edge and having alignment means for orienting the plate. This would include the elements needed to allow a user to produce a plate 20 to correspond to the baseboard molding desired. A preferred kit of parts would therefore include a mold 160 and associated supporting surface 164. Some type of fiberglass resin and hardener additive would be included in some versions of the kit of parts. A spacer 166 and alignment nails 162 would also be included in some versions of the kit of parts.

Where a style of molding is more widely used, a pre-manufactured or standardized plate could be included in the kit of parts.

A preferred kit of parts would also include a plate support 40 and associated upper and lower angle boards 60, 70.

The kit of parts would also include instructions for use and operation.

The previously described versions of the present invention have many advantages, including a primary advantage providing a novel method and apparatus for cutting baseboard molding that reduces the appearance of gaps or defects between mated pieces of baseboard molding.

Another advantage of the present invention is to provide a method and apparatus for cutting baseboard molding that conforms to any molding type, having any height, thickness and ornamental surface configuration.

Another advantage of the present invention is to provide a method and apparatus for cutting baseboard molding that requires only one piece of molding to be cut to form an inside corner.

A still further advantage of the present invention is to provide a method and apparatus for cutting baseboard molding that supports extremely rapid and convenient cutting with high-quality output.

Although the present invention has been described in considerable detail and with reference to certain preferred versions, other versions are possible. For example, while in the preferred version of the invention disclosed, the angle boards are supported by C-clamps from the plate support, in other versions of the invention the angle boards or a similar structure could be integrated into the plate support, thereby reducing the number of subassemblies required. Similarly, while in the preferred embodiment of the invention, pairs of screws are used to raise or lower the baseboard molding to be cut, a variety of height-adjustment devices could be substituted. Therefore, the spirit and scope of the appended claims should not be limited to the description of the preferred versions disclosed.

In compliance with the U.S. Patent Laws, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method of cutting a piece of baseboard molding, the method comprising:

(A) forming a reversible plate of a material in a mold containing two short back-to back segments of baseboard molding, and removing the two short segments of baseboard molding when the material has set up, thereby defining a patterned cutting edge and a spare cutting edge, wherein the patterned cutting edge and spare cutting edge are defined to correspond to a front face of the baseboard molding to be cut, and wherein the plate provides an alignment structure to align the patterned cutting edge with the baseboard molding to be cut;

(B) attaching the plate to a plate support comprising an elongated body and a head, whereby the reversible plate is carried within a recessed area defined in the head, and whereby the plate support engages the alignment structure of the plate, thereby holding the reversible plate in alignment with the plate support, whereby a cutting hole defined in the plate support is adjacent to the patterned cutting edge of the reversible plate;

(C) securing the reversible plate support between the jaws of a clamping apparatus;

(D) securing the piece of baseboard molding between the jaws of the clamping apparatus; and (E) cutting along the patterned cutting edge of the reversible plate, thereby cutting the piece of baseboard molding.

2. The method of claim 1, additionally comprising the step of:

(A) securing an upper angle board and a lower angle board to the plate support.

3. The method of claim 2, additionally comprising the step of:

(A) adjusting screws carried by the upper and lower angle boards to result in a slight bevel in the cut in the piece of baseboard molding.

4. A kit of parts for use in cutting a baseboard molding, comprising:

(A) a reversible plate defining a patterned cutting edge and a spare cutting edge, and having alignment means for orienting the plate; and (B) a plate support, comprising an elongated body and a head, the head defining a cutting hole and a recess sized to receive the reversible plate oriented according to the alignment means.

5. The kit of parts of claim 4, additionally comprising:

(A) an upper angle board carrying an upper screw pair, and (B) a lower angle board carrying a lower screw pair.

6. A kit of parts for use in cutting a baseboard molding, comprising:

(A) means for making a plate defining a patterned cutting edge and a spare cutting edge and having alignment means for orienting the plate; and (B) a plate support, comprising an elongated body and a head, the head defining a recess sized to receive the plate and adapted to receive the plate with an orientation determined by the alignment means.

* * * * *